US007478723B2

(12) United States Patent
Spater et al.

(10) Patent No.: US 7,478,723 B2
(45) Date of Patent: Jan. 20, 2009

(54) TIRE COVER WITH ADJUSTING MEANS

(75) Inventors: Christopher B. Spater, Portsmouth, NH (US); Ryan C. Meers, West Chester, PA (US)

(73) Assignee: Motivation Design, LLC, Salisbury, MA (US)

( * ) Notice: Subject to any disclaimer, the term of this patent is extended or adjusted under 35 U.S.C. 154(b) by 333 days.

(21) Appl. No.: 10/911,986

(22) Filed: Aug. 5, 2004

(65) Prior Publication Data

US 2005/0183973 A1   Aug. 25, 2005

Related U.S. Application Data

(60) Provisional application No. 60/493,563, filed on Aug. 8, 2003, provisional application No. 60/493,432, filed on Aug. 8, 2003.

(51) Int. Cl.
*B65D 85/02* (2006.01)
*B62D 43/00* (2006.01)
(52) U.S. Cl. .................................. 206/304.1; 224/42.2
(58) Field of Classification Search ......... 206/302–304, 206/304.1, 304.2, 335; 224/42.2
See application file for complete search history.

(56) References Cited

U.S. PATENT DOCUMENTS

| 799,662 A | | 9/1905 | Nathan | |
|---|---|---|---|---|
| 1,303,224 A | * | 5/1919 | Achtmeyer | 206/304.1 |
| 1,689,438 A | | 10/1928 | Jellison et al. | |
| 1,889,774 A | * | 12/1932 | Chamberlin | 206/304.2 |
| 1,910,416 A | * | 5/1933 | Wollheim | 206/304.1 |
| 1,947,145 A | | 2/1934 | Zerk | |
| 1,967,522 A | * | 7/1934 | Wengard | 206/304.1 |
| 2,639,934 A | | 5/1953 | Swinamer | |
| 2,676,831 A | | 4/1954 | Scuderi | |
| 2,805,882 A | | 9/1957 | Bohenek | |
| 3,712,586 A | | 1/1973 | Nicholson | |
| 3,871,042 A | * | 3/1975 | Farmer | 114/346 |
| 4,106,681 A | | 8/1978 | Bott | |

(Continued)

FOREIGN PATENT DOCUMENTS

DE          203 03 322 U1    6/2003

(Continued)

OTHER PUBLICATIONS

Wheel Butler [online], Retrieved from the Internet on May 2, 2005 URL:http://www.preyss.com/html/portfolio.html.

*Primary Examiner*—Bryon P Gehman
(74) *Attorney, Agent, or Firm*—Antoinette G Giugliano PC

(57) ABSTRACT

The present invention relates to a tire cover or casing that includes two flexible sides and a central member. The flexible sides have a width sufficient to essentially cover a sidewall of a tire, while allowing, when mounted on the tire, access to the inner opening of the tire; and a securing device for securing the side over the sidewall of the tire. The central member has sufficient length to essentially cover a tire tread; and an adjusting device for adjusting the size of the tire cover or casing to fit the tire. The present invention further includes methods for changing a flat tire, for storing a seasonal tire, and for covering tires for use in a show room or the ground. Additionally, the present invention relates to wheel assemblies and emergency roadside kits, both including the tire cover.

16 Claims, 7 Drawing Sheets

U.S. PATENT DOCUMENTS

| | | | |
|---|---|---|---|
| 4,126,169 A | 11/1978 | Magnuson et al. | |
| 4,230,246 A | 10/1980 | Wilson | |
| 4,294,405 A | 10/1981 | Ross | |
| 5,076,477 A | 12/1991 | Colgan | |
| 5,228,608 A | 7/1993 | Stout, III | |
| 5,439,727 A * | 8/1995 | Riggs et al. | 428/128 |
| 5,513,788 A | 5/1996 | Cochrane et al. | |
| 5,547,187 A | 8/1996 | Spykerman | |
| 5,803,324 A | 9/1998 | Silberman et al. | |
| 5,823,413 A | 10/1998 | Seltz | |
| 5,951,232 A | 9/1999 | Yu et al. | |
| 5,992,942 A | 11/1999 | Passoth et al. | |
| 6,033,003 A | 3/2000 | Bell et al. | |
| 6,044,968 A | 4/2000 | Iampen | |
| 6,116,415 A | 9/2000 | Rastelli | |
| 6,142,192 A | 11/2000 | Dickinson et al. | |
| 6,155,323 A | 12/2000 | Gougelet | |
| 6,189,749 B1 | 2/2001 | Sato et al. | |
| 6,273,159 B1 | 8/2001 | Page | |
| 6,425,639 B1 | 7/2002 | Getzelman | |
| 6,428,112 B1 | 8/2002 | Passoth et al. | |
| 6,439,281 B1 | 8/2002 | Hogg | |
| 6,457,780 B1 | 10/2002 | Ernst | |
| 6,499,591 B1 | 12/2002 | Rizzo et al. | |
| 7,175,058 B2 * | 2/2007 | Chiku et al. | 206/304.1 |

FOREIGN PATENT DOCUMENTS

| | | |
|---|---|---|
| GB | M07513 A | 0/1912 |
| GB | 2106841 A | 4/1983 |
| WO | WO 97/11011 | 3/1997 |

* cited by examiner

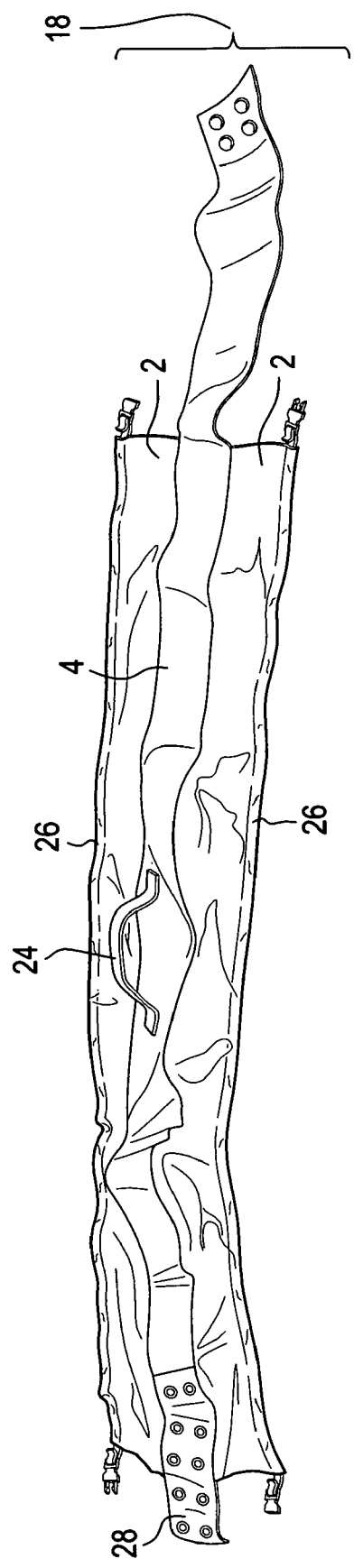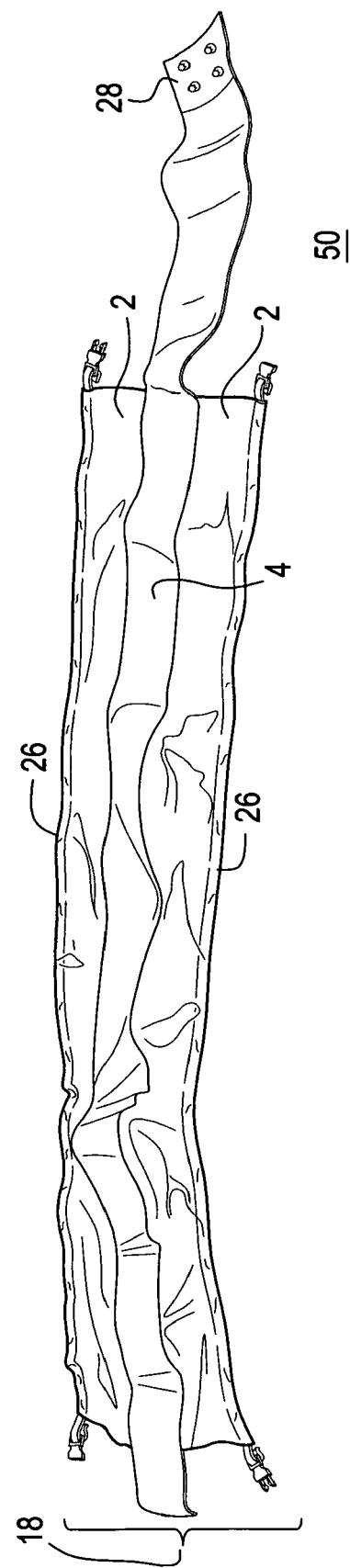

TIRE COVER WITH ADJUSTING MEANS

RELATED APPLICATIONS

This application claims the benefit of U.S. Provisional Application No. 60/493,563, filed Aug. 8, 2003; and U.S. Provisional Application No. 60/493,432, filed Aug. 8, 2003.

The entire teachings of the above applications are incorporated herein by reference.

BACKGROUND OF THE INVENTION

Changing a flat tire can be a messy affair. Grime and dirt that accumulates on the tire from driving the car inevitably gets on the hands and clothes of the person changing the flat tire. Additionally, the interior of the trunk gets dirty when placing the dirty flat tire in the trunk.

Similarly, tires are often changed seasonally. For the winter months, many car owners bring their winter tires to a mechanic for installation on their vehicle. The dirt that is on the tire, from being previously used and/or from being stored in the garage for several months, often gets on a person who is attempting to put the tires in their vehicle for transport to the mechanic.

Accordingly, a need exists for a tire cover or casing that prevents the person handling the tire from getting dirty, but also at the same time allows the person to install a tire on and/or remove the tire from a vehicle. Furthermore, a need exists to carry a tire without getting soiled.

SUMMARY OF THE INVENTION

The present invention relates to a tire cover or casing that allows one to cover a tire to avoid getting dirty, but at the same time the cover allows one to access the inner opening of the tire. More specifically, the present invention allows one to store, carry, handle, mount, or remove a tire without becoming soiled.

In particular, the present invention pertains to a tire cover or casing that includes two flexible sides, and a central member. Each flexible side has a width sufficient to essentially cover a sidewall of a tire, while allowing, when mounted on the tire, access to the inner opening of the tire, and a securing means (e.g., one or more securing members) for securing the sides over the sidewalls of the tire. The central member extends between the two flexible sides, and has sufficient length to essentially cover the tire tread of a tire. The invention can further include an adjusting means (e.g., one or more adjusting members) for adjusting the size of the tire cover or casing to fit the tire. The central member, the flexible sides, or both, in one embodiment are substantially constructed from a material that is soil-resistant, liquid-resistant, or a combination thereof. The central member and flexible sides can be constructed from the same material, from the same piece of material, or from different materials. In another embodiment, the central member is attached to at least one of the flexible sides through a seam (e.g., a continuous seam). The adjusting means include, but is not limited to, one or more of the following: a fastener, a strap, a snap, a buckle, a trap-lock, a button, a hook, an elastic member, a tie, a clip, a zipper, a drawstring & cord lock, a hook-to-hook arrangement, a hook & loop arrangement, a bungee cord & cord lock, a magnet, a slide, or a combination thereof. Similarly, the securing means includes, e.g., one or more of the following: a fastener, a strap, a snap, a buckle, a button, a hook, an elastic member, a tie, a clip, a zipper, a drawstring & cord lock, a hook-to-hook arrangement, a hook & loop arrangement, or a combination thereof. Additionally, the cover embodies one or more means for carrying the tire (e.g., a carrying member) which is attached to the tire cover or casing.

The present invention also embodies a tire cover or casing that includes two flexible sides and a central member. The flexible sides each have a width sufficient to essentially cover a sidewall of a tire, while allowing, when mounted on the tire, access to the inner opening of the tire; and a securing means for securing the side over the sidewall of the tire. The central member extends between the two flexible sides, has a sufficient length to essentially cover a tire tread; and has two ends. The present invention further includes an adjusting means that adjusts the size of the tire cover or casing to fit the tire and fastens each end of the central member. The central member, the flexible sides, or both, in one embodiment are substantially constructed from a material that is soil-resistant, liquid-resistant, or a combination thereof. The central member and flexible sides can be constructed from the same material, from the same piece of material, or from different materials. The adjusting means and the securing means include those means as further described herein. Additionally, the cover embodies one or more means for carrying the tire (e.g., a carrying member) which is attached to the tire cover or casing.

The present invention further relates to methods for changing or removing a flat tire, e.g., so that the soil from the flat tire that gets on the person who is changing the tire, the vehicle, or both is prevented or reduced. The soil from the flat tire is reduced, as compared to performing these steps without the tire cover or carrier of the present invention. The steps of the method includes covering the flat tire with a tire cover or casing. Generally, the tire cover or casing includes two flexible sides, a central member and an adjustable means. Each flexible side has a width sufficient to essentially cover a sidewall of a tire, while allowing, when mounted on the tire, access to the inner opening of the tire; and a securing means for securing the side over the sidewall of the tire. The central member has a length to essentially cover a tire tread and extends between the two flexible sides. The adjustable means adjusts the size of the tire cover or casing to fit the tire. The steps also involve removing the covered, flat tire; and if changing the flat tire, replacing the flat tire with a second tire. This method can be performed so that the person changing the tire, the vehicle, or both do not become soiled. This method can also be performed so that the soil from the tire that gets on a person changing the tire, the vehicle or both is reduced, as compared to performing the steps without the tire cover of the present invention. The present invention also includes placing the covered, flat tire in a storage area of the vehicle.

Other methods of the present invention relate to methods for preventing or reducing marks or soil from getting on a show room floor from a tire; or methods for preventing or reducing soil, grass or the like from getting on a tire when the tire moves across the ground (e.g., show field, paving, gravel, dirt, grass, etc.). Such methods involve covering the tire with the tire cover or casing, as described herein. Once the tire is covered, the methods include either moving the covered tire (e.g., while the tire is mounted on a vehicle) across a showroom floor or the ground. The methods prevent or reduce the marks or soil that gets on a showroom floor from the tire, or prevent or reduce grass, dirt or debris from getting on the tire when moving across the ground. The soil, marks, grass, dirt or debris is reduced as compared to performing the steps without the tire cover or carrier of the present invention.

In yet another embodiment, the present invention pertains to methods for carrying or storing a tire, e.g., while preventing or reducing soil from the tire from getting on a person, storage area, or both. The method includes covering the tire with the tire cover or casing, as described herein, and carrying the covered tire, or placing the covered tire in a storage area. Using the tire cover or casing described herein to cover the tire prevents or reduces soil from getting on the person carrying or storing the tire. The storage area for the tire (e.g., a garage, basement, shed) also stays clean. The soil is reduced as compared to performing the steps without the tire cover or carrier of the present invention.

Wheel assemblies are also included as an embodiment of the present invention. Such wheel assemblies include a tire having a tire tread and sidewalls, a rim attached to the tire and used for securing the tire to a vehicle; and the tire cover or casing. The tire cover or casing has a width sufficient to essentially cover the sidewall of a tire, while allowing access to the inner opening of the tire, and a central member, extending between two flexible sides, having sufficient length to essentially cover the tire tread. The tire cover can further include the securing means and adjusting means that are described herein.

The present invention additionally embodies an emergency tire kit or roadside tire kit that includes the tire cover or casing, as described herein. The kit optionally includes one or more tools (e.g., a jack, a wrench) used to change a flat tire, or items that can further prevent or reduce the user from generally getting dirty (e.g., wet wipes, gloves, or similar items). The kit can also include a kneeling pad. The kneeling pad can also act as a pouch for the tire cover.

Advantages of the present invention include the ability to attach the tire cover or casing to a tire that is mounted to a vehicle. The present invention advantageously allows access to the inner opening of the tire so that one can dismount or mount the tire to a vehicle. Still another advantage of one embodiment, is that the tire cover is adjustable to fit a number of different size tires, and can substantially or fully cover the tire, while leaving access to the inner opening of the tire. Yet another advantage of the present invention is that, in some embodiments, the tire cover or casing is made from a liquid-resistant material, soil-resistant material, or both. This aspect prevents the user and/or a storage area (e.g., a trunk of a car) in which the covered tire sits from getting dirty.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6A is a bird's eye view of the outside portion of another tire cover embodiment when not secured to a tire.

FIG. 6B is a bird's eye view of the inside portion of another tire cover embodiment when not secured to a tire.

DETAILED DESCRIPTION OF THE INVENTION

The present invention relates to a tire cover or casing that allows one to cover a tire, while the tire is still on a vehicle, and replace or handle a tire without getting soiled.

Figure 1A:
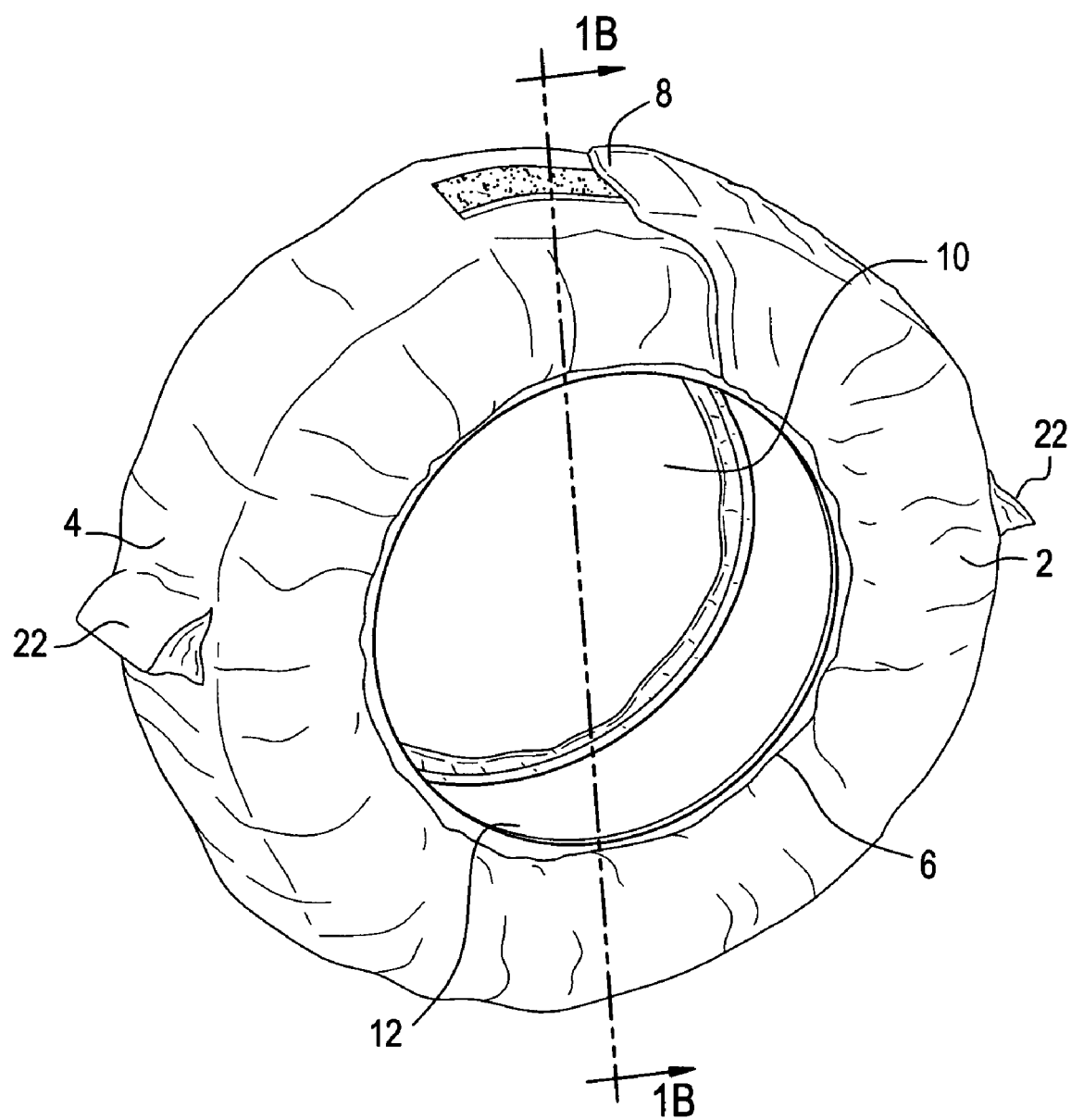
FIG. 1A is a perspective view of one embodiment of the tire cover mounted on a tire.

As shown in FIG. 1A, the tire cover of the present invention includes two flexible sides 2 and central member 4, that are constructed in such a way to allow access to inner opening 10 of tire 12. In particular, flexible sides 2 have a width that essentially covers a sidewall of tire 12. Essentially covering a sidewall of tire 12 refers to covering the majority of, most of, fully, some of, or essential portions of the sidewall of tire 12. In some embodiments, essentially covering the sidewall of tire 12 also refers to covering strategic or essential portions of the sidewall of tire 12 to accomplish the purpose for covering the tire e.g., changing a flat tire or storing a seasonal tire. For example, if one is covering a flat tire so that it can be changed, then most all of the sidewall that faces the person changing the tire, or the side that will be used to lay the covered, flat tire in a storage area e.g., a trunk, should be covered to prevent or reduce the user or the vehicle from getting soiled.

The tire cover of the present invention also comprises central member 4. Central member 4 has a sufficient length to essentially cover tire tread 16 of a tire (See FIG. 1B). To essentially cover a tire tread refers to covering the majority of the tire tread, most of the tire tread, fully covering the tire tread, covering some of the tire tread, or covering essential portions of the tire tread. Covering essential portions of the tire tread refers to covering strategic portions to carry out the use or application of the tire cover. In one example, the covering can be used to store seasonal tires, and so central member 4 should cover enough of the tire tread so that the tire can be stored in an area without getting the person handling the tire, or the area in which it is stored dirty. In another embodiment where tire cover or casing 30 also has a means for carrying it, as further described herein, central member 4 should cover enough of the tire tread so that the tire does not fall out of tire cover or casing 30.

Figure 1B:
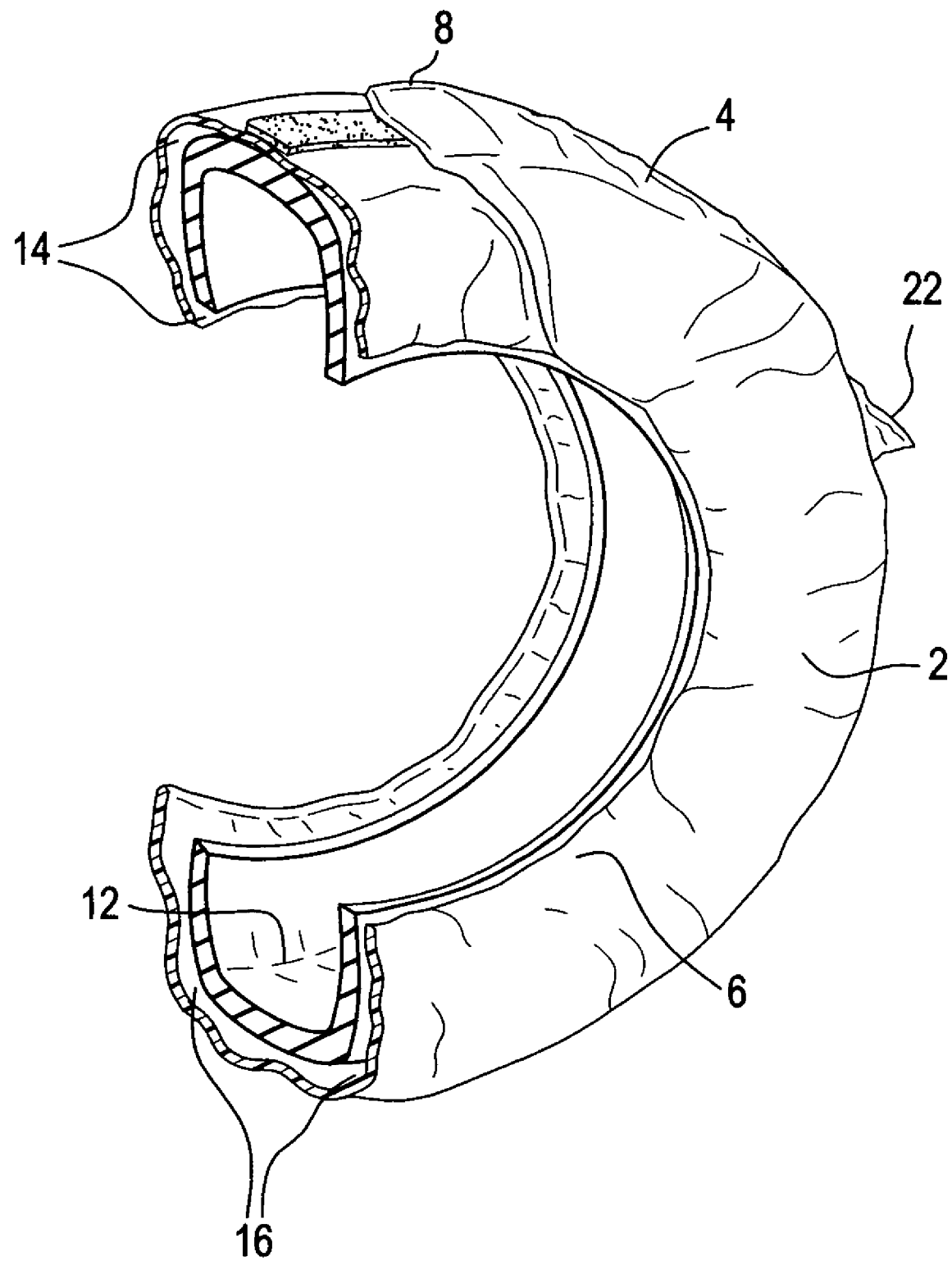
FIG. 1B is a cross-sectional view of an embodiment showing the "C" shape of the tire cover when mounted on the tire.

Central member 4 extends between flexible sides 2, and receives tire tread 16 (See FIG. 1B). Central member 4 is also flexible enough so that it can be secured around tire tread 16. Central member 4 and flexible sides 2 can be made of the same piece of material, different pieces of the same material, different pieces of different types of materials, or any combination thereof. The number of pieces of material is not important so long as central member 4 and flexible sides 2 essentially cover tire tread 16 and sidewalls 14, respectively, as described herein. If tire cover or casing is made from more than one piece of material, whether it is the same type of material or not, the pieces can be attached by a durable seam, snaps, fasteners, or similar means; so long as the pieces adhere to one another when the tire is covered or carried. The method of attachment of such pieces, e.g., between flexible sides 2 and the central member 4, can be a continuous attachment (e.g., with a continuous seam), or a periodic attachment (e.g., with snaps that are spaced apart every few inches).

As shown in FIG. 1B, when mounted on tire 12, tire cover or casing of the present invention forms the shape of the letter "c" in a cross-sectional view. Tire cover or casing 30 hugs or conforms to the shape of the tire and is accomplished, in part, with the adjustable means, the flexible material, and/or the securing means, as further described herein. Put another way, when mounted to tire 12, the tire cover of the present invention forms a donut shape wherein the donut is hollowed out, leaving a three-sided donut shell when looked at in this cross-sectional view.

This shape is advantageous because it allows access to inner opening 10 of tire 12. Inner opening 10 is generally occupied by the rim of tire 12, where the lug-nuts would be used to secure tire 12 to a vehicle. Access to inner opening 10 allows one to secure the tire cover of the present invention to tire 12 while tire 12 is mounted on a vehicle. One can change tire 12 while it is covered with the tire cover because access to the lug nuts exists. Thus, although the tire in some embodiments, is fully covered to prevent or reduce the user or storage areas from getting soiled or dirty, access to inner opening 10 of tire 12 is still allowed.

A wide variety of materials can be used to construct the tire cover of the present invention. Synthetic fabrics, organic fabrics, or plastic sheet materials are among the types of materials that can be used to make the tire cover. Some materials can be reinforced with plastic coatings to improve their strength. Plastic coatings can also be used to make materials liquid-resistant, soil-resistant, or both.

Liquid-resistant material refers to material that allows less liquid to permeate the fabric (e.g., less porous) than one that is not liquid-resistant. Liquid-resistant material includes material that reduces or prevents (e.g., liquid-proof) liquid from flowing through the material. Such materials are known in the art and can be obtained from a number of manufacturers. Examples of such liquid-resistant materials include polyethylene, polyurethane coated nylon, and polyester. Such fabrics can be obtained, e.g., from Seattle Fabrics (Seattle, Wash.) or Jiunn-Jang (Tien-Chung, Taiwan). Liquid-resistant materials now known or later developed can be used with the present invention.

The material used for the tire cover of the present invention can also be soil-resistant. Soil-resistant material is material that fully prevents, or reduces soil or debris from permeating the fabric. Soil-resistant material includes, for example, cotton, polyethylene, Tyvek® material, rayon, and nylon. Such fabrics are known in the art and can be obtained from a number of manufacturers including Beacon Fabric & Notions (South Pasadena, Fla.). Soil-resistant materials now known or later developed can be used with the present invention. Materials that are soil-resistant and liquid-resistant can be used with the present invention.

Preferably the material used e.g., for the sides and/or central member 4, is flexible. Flexible material is material that allows movement of the fabric so that it can be adjusted and/or secured to attach to the tire, and, e.g., be folded for storage when not in use. Flexible material is generally either thin-walled material that can be compacted, or fabrics that exhibit elastic properties (e.g., Spandex). Flexible materials are known in the art, and are obtainable by a skilled artisan. Such fabrics include e.g., polyethylene, polyurethane coated nylon, polyester, cotton, Tyvek® material, and rayon. In another embodiments, metal linking such as chain links can be used as flexible material, when, for example, one is covering a heavy and/or large tire such as a tractor tire. Distributors of such fabrics includes Fabric Line (Portland, Oreg.), and Pong-Jung (Taiwan). Flexible materials now known or later developed can be used with the present invention. Flexible materials can also be liquid-resistant, soil-resistant, or both. Flexible material can be used to construct the entire tire cover or casing of the present invention, or portions of the tire cover (e.g., only the flexible sides, both the flexible sides and the central member, portions of either, or portions of both). For example, portions of the tire cover can be made of flexible material to provide enough flexibility to allow the flexible sides to essentially cover the sidewalls of the tire, or to allow the central member to essentially cover the tire tread.

In one embodiment, tire cover or casing 30 (shown in FIGS. 1A, 1B, 2 and 3), preferably is used for changing a flat tire, and is made from polyethylene material. Another embodiment includes making tire cover or casing 40 (shown if FIGS. 4A, 4B and 5), that is preferably used for storing a tire, from a combination of nylon and polyester materials.

The tire cover of the present invention utilizes an adjustable means to attach to tires of various sizes (e.g., more than one size tire). As such, the tire cover is preferably universal. Tire sizes vary by the diameter of the tire, width of the tread, and by the width of the sidewalls. The tire cover of the present invention can be adapted with the adjustable means to fit a number of different types of tires including, for example, car tires, sport utility vehicle tires, truck tires, race car tires, drag race tires, tractor trailer tires, construction vehicle tires, and spare tires provided for such vehicles. In one particular embodiment, the tire cover has a length, or circumference that is suitable for tires that are generally used on cars, light trucks and sport utility vehicles. Such a length or circumference ranges between about 270 cm and about 160 cm, preferably between about 255 cm and about 175 cm, and fits tires having a diameter in a range from about 90 cm and about 40 cm, and preferably between about 79 cm and 56 cm. In another embodiment, the tire cover of the present invention is used for very large tires (e.g., for use in tractors). A tire cover or casing for large tires, for example, has a length or circumference in a range between about 680 cm and about 400 cm, preferably between about 644 cm and about 426 cm, and fit tires having a diameter between about 230 cm and about 120 cm, preferably between about 212 cm and about 136 cm. In yet another example, specialized tires such as those used for ATV or motorcycles, the tire cover of the present invention has a length or circumference in a range between about 230 cm and about 175 cm, preferably between about 218 cm and about 189 cm, and fits tires having a diameter between about 75 cm and about 55 cm, preferably between about 70 cm and about 60 cm. Tire covers for commercial truck tires, or similar tires also encompass the present invention and have, in an embodiment, a circumference or length in a range between about 380 cm and about 260 cm, preferably between about 365 cm and 277 cm, and fits tires with a diameter in a range between about 120 cm and about 80 cm, preferably between about 116 cm and about 88 cm. The above are simply examples of various kinds of tires and ranges of sizes for which the present invention can be used. Accordingly, the tire cover of the present invention can have an overall length or circumference, before being adjusted with the adjustable means, in a range between about 700 cm and about 150 cm, and preferably between about 300 cm and about 160 cm, and fit tires with a diameter that ranges from about 300 cm to about 40 cm, and preferably between about 120 cm and about 40 cm. Accordingly, the tire cover of the present invention can be made to fit (e.g., with respect to circumference, length, and/or width) a certain category or type of tire (e.g., large tires), tires in certain ranges (e.g., of more than one category), a range within these types (e.g., a length or circumference of between about 200 cm and about 205 cm to fit an ATV tire), to fit only one size tire, or any combination thereof. A number of tire manufacturers exist and include, for example, Bridgestone/Firestone North American Tire, LLC (Akron, Ohio) and The Goodyear Tire & Rubber Company (Akron, Ohio).

Tires also vary in width. The maximum tire width varies depending on the sectional height of the tire. The section height of the tire is the radial distance from the outer edge of the rim to the outer edge of the tire. Tire widths range from about 1 cm and about 100 cm, and preferably between about 15 cm and about 26 cm. The tire cover of the present invention can be adapted to fit a number of different tire widths in this range (e.g., cars, light trucks, SUVs having a width in a range between about 15 cm and about 34 cm; large tires such as tractor tire having a width in a range between about 25 cm and about 89 cm, specialized tires such as ATV tires having a width in a range between about 20.3 cm and about 26.9 cm, or motorcycle tires having a range between about 6.4 cm and about 24.1 cm, commercial truck tires having a width in a range between about 24.1 cm and about 44.2 cm, or bicycle tires having a width between about 1 and about 3 cm). For example, a tire cover made for cars, light truck and SUVs can have width ranging between about 15 cm and about 34 cm; for large tires such as a tractor tire, a width ranging from about 75 cm and about 270 cm; for specialized tires, a width ranging from about 18 cm and about 50 cm, and for commercial truck tires, a width between about 72 cm and about 132 cm. Overall, tire cover or casing of the present invention has a width ranging from about 3 cm and about 300 cm, and preferably between about 30 cm and about 50 cm. In one embodiment, tire cover or casing 30 (e.g., FIG. 1A) has a width of about 41 cm, and tire cover or casing 40 (e.g., FIG. 4A) has a width of about 46 cm, both fitting tires having a width ranging between about 15 cm and about 28 cm.

The adjusting means and securing means operate to secure tire 12 in the tire cover of the present invention so that it does not fall out when carried (e.g., by a person or machine such as a forklift), handled, or stored. The material, any modes of attachment of more than one piece of material, the adjusting means and/or the securing means are preferably selected to be durable enough to securely hold the weight of the tire so that it can be carried, handled, or stored. The tire carrier of the present invention is made to hold tires having weights less than about 500,000 grams (about 1100 lbs) and preferably less than about 31751 grams (70 lbs) (e.g., between about 31751 grams and about 4536 grams (10 lbs)). For example, in one embodiment, fastener 8 (e.g., more specifically a Velcro® brand fastener) was used as an adjusting means. The fastener was about 5 cm×15 cm on the hook side and 61 cm×10 cm on the loop side. When attached, this fastener was strong enough to hold a tire weighing about 31751 grams (70 lbs).

The adjusting means, shown as fastener 8 in FIGS. 1A and 1B, refer to any means that allow the tire cover of the present invention to be adjusted to fit a tire tread of more than one size tire. Examples of adjusting means that can be used with the present invention include fasteners, straps, snaps, buckles (e.g., cam buckles or center release buckles), buttons, hooks (e.g., hook-to-hook arrangements, hook & loop arrangements, snap hooks) elastic members, trap-locks (e.g., plastic trap-locks), ties, clips, zippers, drawstring & cord lock arrangements, hook-to-hook arrangements, hook & loop arrangements, bungee cord & cord lock arrangements, magnets, slides (e.g., plastic slides), and combinations thereof. Combinations of one or more of such items can be used for the adjustable means. One embodiment the adjustable means includes use of fastener 8 (e.g., a Velcro® fastener), and in another embodiment the means includes use of a series of snaps 28 (see FIGS. 6A and 6B). Yet another embodiment includes a combination of fasteners and snaps. Adjustable means that are now know or later developed can be used so long as the means allow adjustment of the tire cover to fit a tire tread of at least more than one size tire. Adjustable means are commercially available, and can be obtained, for example from National Webbing Products Co. (Garden City Park, N.Y.), or National Molding Corporation (Farmingdale, N.Y.).

The securing means, shown as elastic members 6 in FIGS. 1A and 1B, refer to means that allow flexible sides 2 to adhere to or essentially cover sidewall 14 of tire 12. The securing means also help to prevent tire 12 from falling out of the tire cover of the present invention. Any means that are known or later developed can be used so long as the means essentially cover a sidewall of a tire, as further described herein. Examples of securing means include, but are not limited to, fasteners, straps, snaps, buckles, buttons, hooks, elastic members, ties, clips, zippers, drawstring & cord lock arrangements, hook-to-hook arrangements, hook & loop arrangements, and combinations thereof.

Combinations of one or more of such items can be used for the securing means. One embodiment the securing means are elastic members 6, and in another embodiment the means are a set of straps 26 with a male and female set of clips (See FIGS. 4A and 4B). Yet another embodiment includes a combination of both elastic members and straps. The securing means can continue along the outer edges of the flexible sides, as shown in FIGS. 1A and 1B, or can be discontinuous. An example where the securing means are discontinuous uses 4 or 5 pieces of elastic that are attached along the outer edge of the flexible sides, instead of one continuous piece. Securing means are commercially available, and can be obtained, for example from National Webbing Products Co. (Garden City Park, N.Y.), or National Molding Corporation (Farmingdale, N.Y.).

Additionally, the adjustable or securing means can be interwoven in the fabric used for central member 4 and/or flexible sides 2, or a portion thereof. In one embodiment, elastic members can be interwoven in the fabric to secure the tire cover of the present invention to sidewalls 14 of tire 12, to adjust the central member 4 to fit tire tread 16 of tire 12, or both. In this embodiment, since the means for securing or adjusting is within the fabric itself, an additional securing or adjusting means is not needed. An example of a fabric that has securing means interwoven in the fabric is Spandex® brand fabric.

The tire cover or casing of the invention optionally includes means for carrying the protected tire. One or more carrying means can be employed and they can be located at various positions on the tire cover or casing. Handles, flaps, hooks or other suitable means can be employed.

The covered tire can be carried e.g., by a person, by a machine, or by a construction vehicle (e.g., a fork lift). As such, a number of various means are suitable for attaching to tire cover of the present invention so that the covered tire can be carried in a number of ways. For example, one or more handles can be attached to the tire cover or casing in one or more positions so that a person can carry or otherwise handle the tire. In FIG. 1A, two flap handles 22 are placed at the 3 and 9 o'clock position so that the users can easily remove a flat, covered tire from a vehicle and place it in a storage area such as a trunk. Flap handles 22 are those handles where the material overlaps itself to create the handle. In the embodiment shown in FIGS. 4A and 4B, one handle, handle 24, exists so that the user can carry a covered seasonal tire in each hand to a storage area. In yet another embodiment, a forklift handle can be attached to the tire covering or casing, in the case of a tractor tire, so that a forklift can carry the covered tire to the desired location. The carrying means (e.g., handles) that are known in the art, or later developed can be used with the present invention. Materials that can be used for the handle include e.g., polyethylene, polyurethane coated nylon, polyester, cotton, Tyvek® material, molded plastic, metal, steel, and rayon. Distributors of such materials or handles include, e.g., Fabric Line (Portland, Oreg.), Pong-Jung (Taiwan), and National Molding corporation (Farmingdale, N.Y.).

Figure 5:
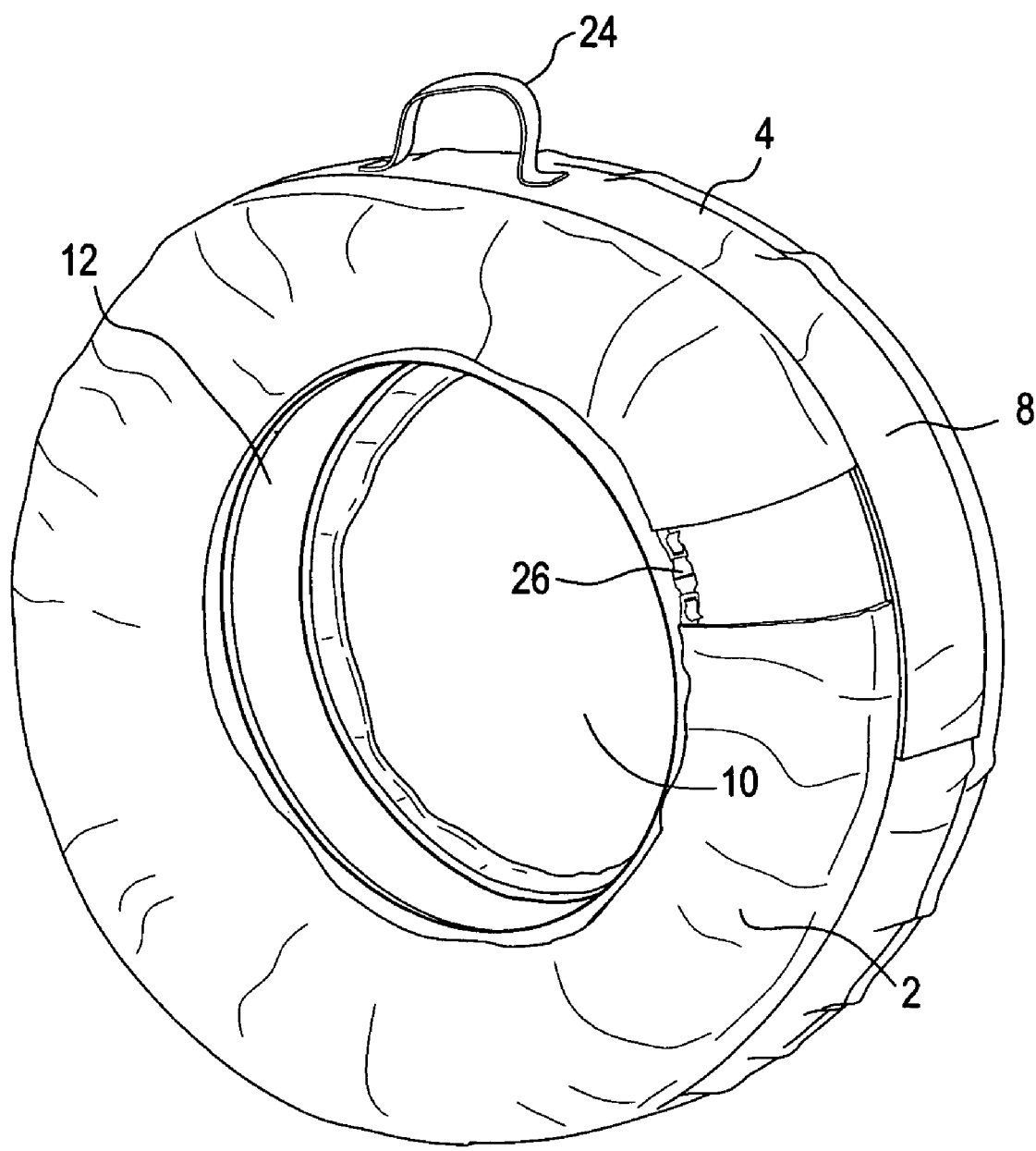
FIG. 5 is a perspective view of another embodiment of a tire cover as mounted on a tire.

The carrying means can be placed in a number of positions including placing the carrying means, when mounted to the tire, so that it would go across tire tread 16, as shown in FIG. 1A. This placement of the carrying means makes it easier for one to remove a tire that was mounted to a vehicle. Another position for attaching the carrying means is placing the means along tire tread 16, which makes it easier for the user to carry more than one covered tire (e.g., one in each hand), as shown in FIG. 5.

Figure 2:
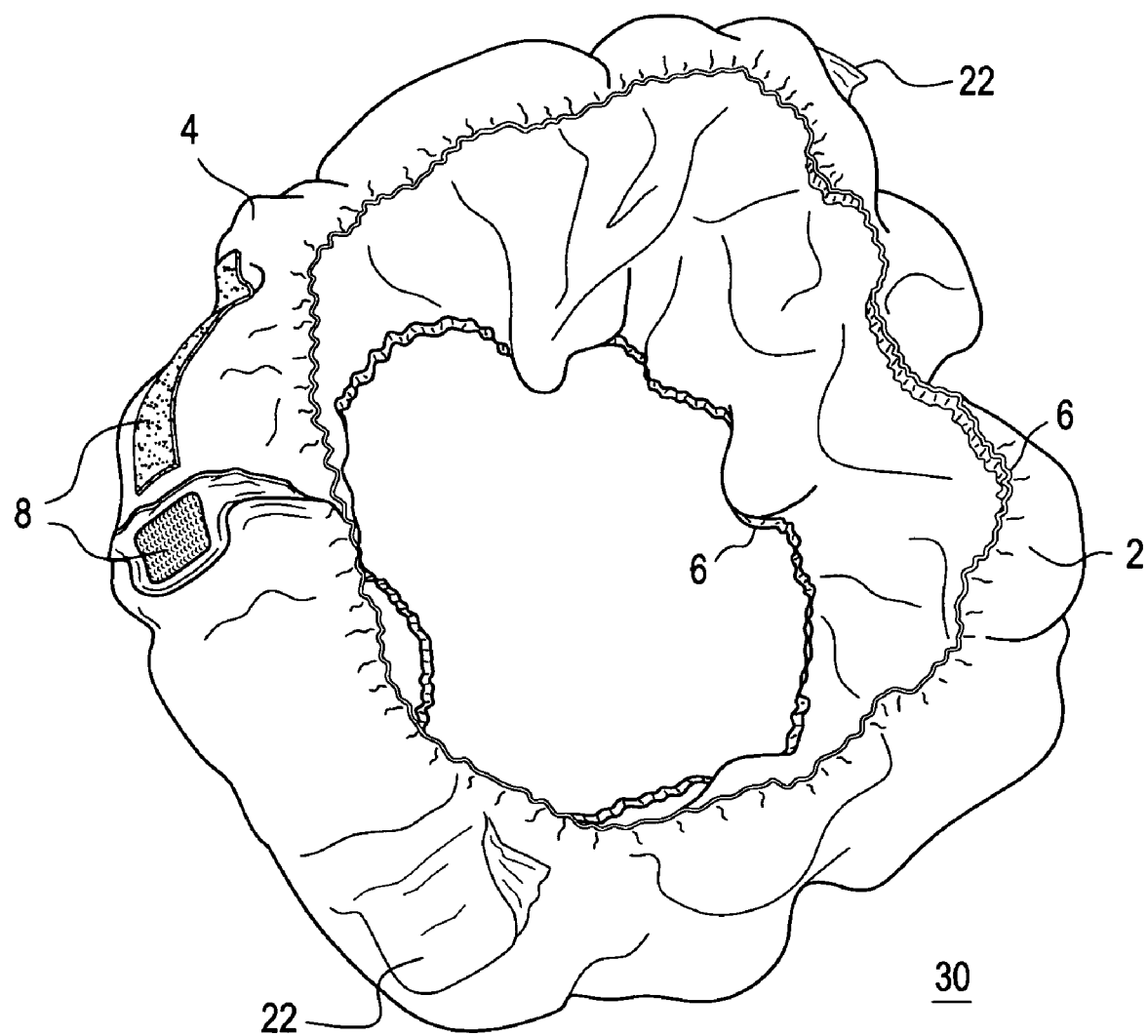
FIG. 2 is a perspective view of an embodiment of the tire cover when not installed on a tire.

When not mounted to tire 12, the tire cover or casing can take an irregular shape. Shown in FIG. 2 is tire cover or casing 30, having elastic members 6 for securing tire cover or casing to a tire. In other embodiments, further discussed below, the tire cover or casing can take the form of a trough shape, when not fully mounted on the tire. (See FIGS. 4A and 4B.) The shape that the tire cover of the present invention takes when not mounted on tire 12 can vary, depending, for instance, on the number of pieces of material used, the type of adjustable means used, the type of securing means used, or on other factors.

Figure 3:
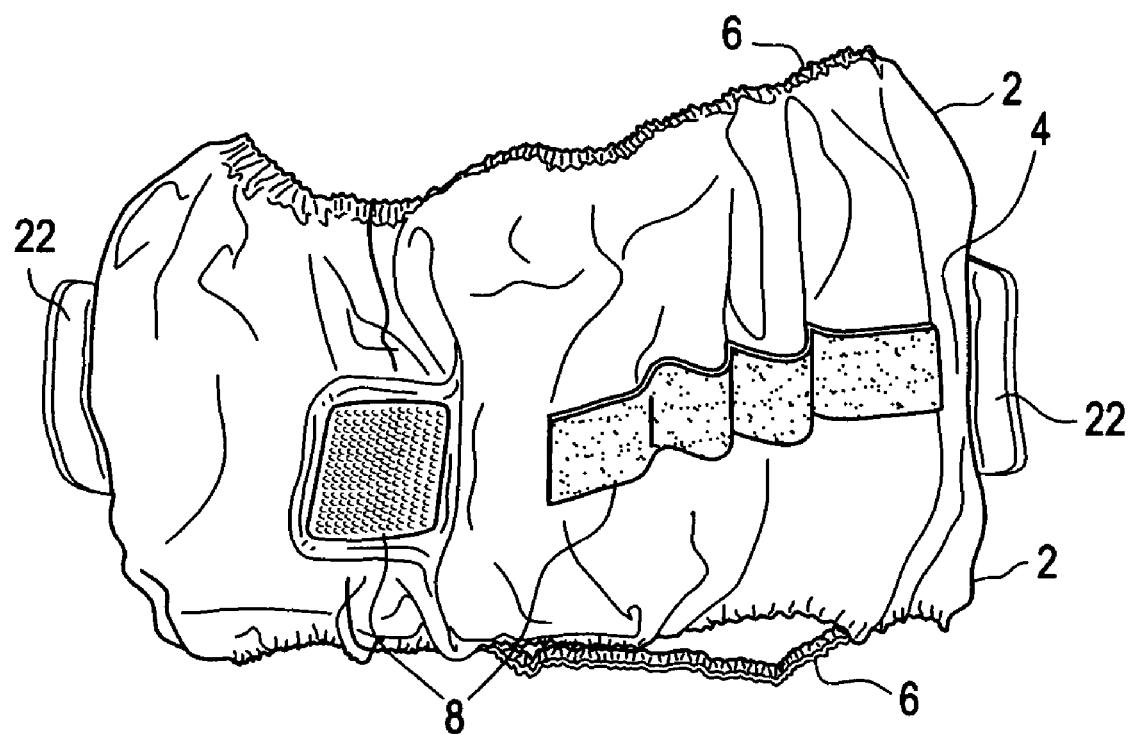
FIG. 3 is a side view of an embodiment of the tire cover when not installed on a tire, showing a means for adjusting the tire cover to fit a tire.

Shown in FIG. 3 is tire cover or casing 30, the adjusting means employed are fastener 8, in particular a male Velcro® fastener end and female Velcro® fastener end for adjusting tire cover or casing 30 over the tire tread. Other adjusting means can be employed, as further discussed herein. Tire cover or casing 30 also includes continuous elastic members 6, the securing means, that allow flexible sides 2 to essentially cover the sidewalls of a tire.

In the embodiments, shown in FIGS. 1A, 1B, 2 and 3, tire cover or casing 30 fully covers sidewall 14 of tire 12. Such an embodiment is ideal for covering a flat tire in order to change the tire because the aspects of the present invention prevent or reduce the person changing the tire from getting soiled, and also prevent or reduce a storage area, such as the inside of a trunk, from getting dirty. This particular embodiment has been made to be adapted to fit tires having diameters in a range between about 55.8 cm and about 78.7 cm, and widths having less than about 27.9 cm.

Figure 4A:
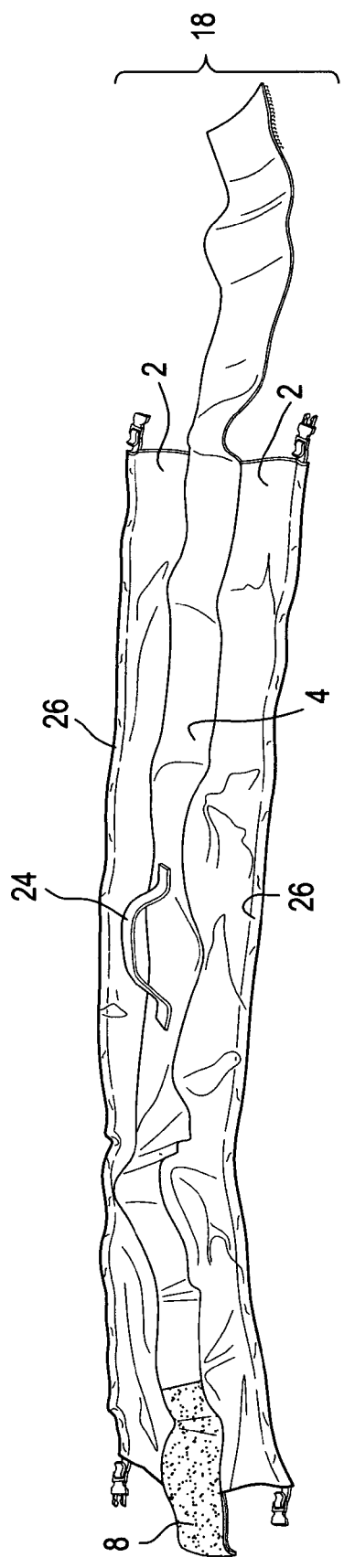
FIG. 4A is a bird's eye view of the outside portion of a tire cover embodiment when not secured to a tire.
Figure 4B:
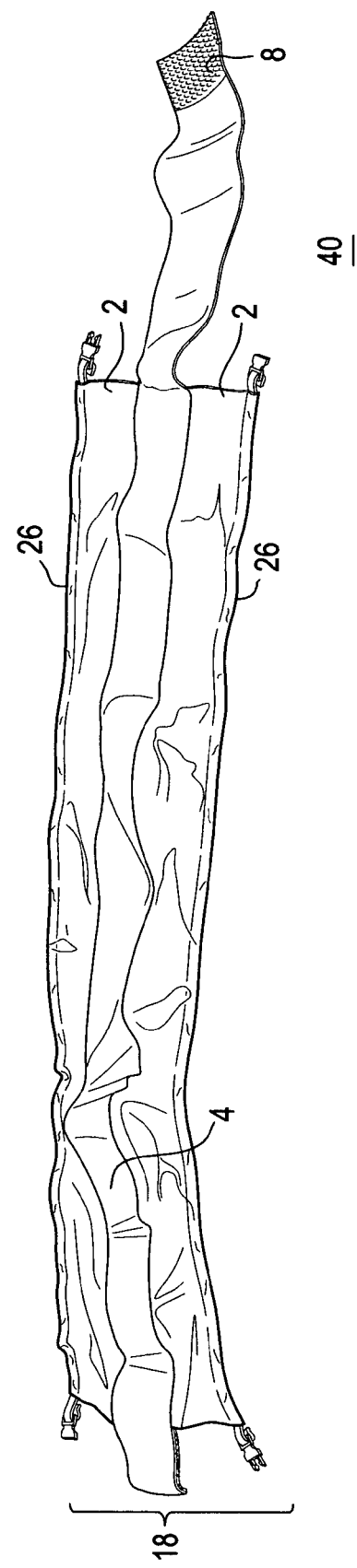
FIG. 4B is a bird's eye view of the inside portion of a tire cover embodiment when not secured to a tire.

In another embodiment of the invention, the tire cover of the present invention can be constructed to have to ends capable of being joined together to form a circular covering. For instance, the tire cover or casing can have an essentially flat shape or take the shape of a trough, when not mounted to tire 12. Shown in FIGS. 4A and 4B is tire cover or casing 40. FIG. 4A shows the outside of trough-shaped tire cover or casing 40, while FIG. 4B shows the inside or tire-facing side of tire cover or casing 40. In this embodiment, central member 4 has two ends 18 that can be attached with adjustable means, in this case fastener 8, or by any means for attaching two ends of fabric. In this embodiment, the adjustable means has at least 2 functions: to attach ends 18 and for adjusting tire cover or casing 40 to fit a tire. Also, securing means comprise a strap and clip combination 26. Any number of adjustable means and securing means can be employed, as further described herein. Tire cover or casing 40 also has handle 24, used to carry the covered tire.

FIG. 5 depicts tire cover or casing 40 shown in FIGS. 4A and 4B mounted on a tire. When mounted on tire 12, tire cover or casing 40 takes a hollowed out donut shape, as described herein. When attaching tire cover or casing 40, the securing means, having a strap and clip combination 26 described above are fastened together, and then tightened so that flexible sides 2 cover sidewalls 14 of tire 12. Additionally, the adjustable means has been adjusted to fit the tire, and it is also used to attach ends 18. In a particular embodiment, tire cover or casing 40 shown in FIGS. 4A, 4B and 5 can be used to store seasonal tires. Although it can also be applied while the car is up on a jack or lift, the trough shape is ideal for storing a seasonal tire because tire cover or casing 40 can be applied on the ground. Tire cover or casing 40 can be slipped on half of tire 12, for example, and then tire 12 can be rolled onto the other half of tire cover or casing 40, and the user can attach ends 18 with the adjustable means and then secures flexible sides 2 with the securing means. In another embodiment, tire cover or casing 40 can be laid on the ground and tire 12 can be rolled over it, followed by wrapping the cover around the and joining together ends 18.

Although the embodiment shown in FIG. 1 is ideal for changing a flat tire, and the embodiment shown in FIG. 5 is ideal for storing a seasonal tire, the uses for tire cover or casing are interchangeable.

FIGS. 6A and 6B show yet another embodiment of the present invention. Shown in FIGS. 6A and 6B is tire cover or casing 50 that is similar to that shown in FIGS. 4A and 4B, but use a plurality or series of snaps 28 as an adjustable means and to connect ends 18, rather than using a fastener. These figures illustrate that a number of options exist for not only the adjustable means, but also for the securing means. A number of various options can be used so long as the adjustable means can be adjusted to essentially cover tire tread 16 of tire 12, and/or the securing means can essentially cover sidewall 14 of tire 12.

Instead of adjustable means, one could manufacture tire covers or casings that are made for specific size tires. Accordingly, the present invention includes a tire cover or casing with one or more of the elements described herein. In particular, the present invention includes a tire cover or casing with two flexible sides, each side having a width sufficient to essentially cover a sidewall of a tire, while allowing, when mounted on the tire, access to the inner opening of the tire; and a securing means for securing the side over the sidewall of the tire. The present invention can also include a central member, extending between the two flexible sides, having sufficient length to essentially cover a tire tread.

The present invention includes methods for removing a flat tire or changing a tire so that the soil from the flat tire that gets on a person changing the tire, the vehicle, or both is prevented or reduced. The method includes covering the flat tire with the tire cover of the present invention, as described herein. More specifically, covering the tire with the tire cover of the present invention includes, e.g., using an embodiment similar to that shown in FIG. 1A, slipping the tire cover of the present invention over the flat tire, adapting the adjusting means to fit the tire. The tire is covered while the tire is mounted on the vehicle, and the vehicle can first be raised by a jack, a lift, or similar device. The securing means, depending on the type used, can also be adapted by the user to cover sidewall 14 of tire 12, or can be self-adaptable. Since the present invention allows one to have access to the lug-nuts, one then removes the lug-nuts and then the covered tire. The person changing the tire can then replace the covered flat tire with a spare tire or second tire. The method further includes placing the covered, flat tire in a storage area such as a trunk of a car, or bed of a pick-up truck. The person or the storage area in the vehicle does not get dirty, or gets less dirt on them because the tire cover securely attaches and covers the tire, and is made of material that is soil-resistant, liquid resistant, or both.

When practicing methods of the present invention, the soil from a tire that gets on a person, vehicle, storage area, or other similar item is prevented or reduced by covering the tire with the tire cover of the present invention. To prevent soil e.g., from getting from the tire on a person, refers to prohibiting or avoiding soil from getting on the person or object. To reduce soil e.g., from getting from the tire on a storage area, refers to lessening in amount, intensity, quality, or type of soil that gets on the person or object. The reduction of soil can be determined by comparing the amount, intensity, quality, or type of the soil to soil that results from performing the steps of the method without the tire cover or carrier of the present invention.

Another method that is encompassed by the present invention is a method for storing or carrying a tire so that the soil from the tire does not get on a person, storage area or both. The steps include covering a tire (e.g, a seasonal tire) using tire cover of the present invention, e.g., tire cover or casing 40. Covering a seasonal tire with e.g., the embodiment shown in FIGS. 4A and 4B, can further include slipping tire cover or casing 40 over tire 12, and adapting the adjustable means to essentially cover tire tread 16, and further adapting the securing means (e.g., the straps and clips) to essentially cover sidewall 14 of tire 12. Once covered, the method includes carrying the covered tire, placing the covered tire in a storage area, or otherwise handling the covered tire. Performing these steps prevents or reduces the user or storage area from getting soiled or dirty. The tire cover also further prevents the tire from getting dirty while being stored e.g., in a garage.

The present invention further pertains to methods for preventing or reducing marks or soil from a tire from getting on a show room floor, or to methods for preventing or reducing grass or soil from getting on a tire when the tire moves across the ground (e.g., show field, paving, dirt, grass, etc.). The methods encompass covering the tire while the tire is attached to the vehicle. More specifically, covering the tire with the tire cover includes, e.g., using an embodiment similar to that shown in FIG. 1A, slipping tire cover or casing 30 over the flat tire, adapting the adjusting means to fit the tire. In one embodiment, the vehicle can be raised by a jack, a lift, or similar device to apply the tire cover. In another embodiment, the tire cover of the present invention can also be put on while the vehicle is on the ground by placing the tire cover over the tire and driving the car forward until the portion on the tire is now under the tire. The rest of the tire cover of the present invention can then be secured around what is now the top part of the tire. Once the tire is covered, then the vehicle can be driven over a showroom floor, or the ground. Moving the covered tire across a showroom floor would not mark or otherwise soil the floor. Likewise, moving the covered tire across the ground, e.g., a show field prevents or reduces dirt, grass, debris or soil from getting on the tire.

The present invention relates to a wheel assembly. The wheel assembly includes tire 12 with a rim attached to the tire, and the tire cover or casing of the present invention, as further described herein. The rim is used for securing the tire to a vehicle. Such a wheel assembly can be sold or manufactured to prevent or reduce persons handling the tire, or purchasers of the tire from getting soiled.

A kit is another embodiment of the present invention. A kit includes the tire cover or casing of the present invention, as described herein, that allows access to the inner opening of tire 12. The kit can optionally further include tools (e.g., a jack, or a wrench) used for changing a flat tire, items that can further prevent or reduce the user from generally getting dirty (e.g., wet wipes, gloves, or similar items), and/or a kneeling pad. In one embodiment, the pouch of the tire cover converts into a kneeling pad that can be used while changing a flat tire. Such an emergency kit can further include emergency flares, emergency blanket, flashlight, jumper cables, or other items normally included in such a kit.

A description of preferred embodiments of the invention follows.

EXEMPLIFICATION

Example 1

Materials and Dimensions of an Emergency Tire Cover

A tire cover shown in FIGS. 1A, 1B, 2 and 3 was made from a single piece of liquid-proof, soil-proof material. The material used is a polyethylene material obtained from Best Bags company located in Xiamen, China. As shown in the figures, the tire cover is circular and has an outer circumference of about 263.2 cm, and a width of about 45.7 cm. This size tire cover fits tires ranging in a diameter of between about 55.9 cm and about 78.7 cm. A Velcro® brand fastener was used to adjust the tire cover to fit the tire, and elastic members were used to secure the flexible sides to the sidewall of the tire. This embodiment substantially or fully covers the tire tread and sidewalls of the tire.

This tire cover was tested by placing a 70 lb tire (31751 grams) in the tire cover and hanging the covered tire for 3 weeks. The fastener was about 5 cm×15 cm on the hook side and 61 cm×10 cm on the loop side. The ends of the fastener overlapped by about 3 inches or by about 7.6 cm in length. This weight was sustained by the tire cover, and the tire did not fall out of the tire cover.

Example 2

Materials and Dimensions of a Seasonal Tire Cover

A tire cover shown in FIGS. 4A, 4B, and 5 was made from three pieces of material, and from two different types of material. The central member was made from polyester, and the flexible sides were made from nylon. As shown in the figures, the tire cover is a trough shape and has a length of about 251.5 cm, and a width of about 45.7 cm. This size tire cover fits tires ranging in a diameter of between about 55.9 cm and about 78.7 cm. A Velcro® brand fastener was used to adjust the tire cover to fit the tire, and a strap and clip combination was used to secure the flexible sides to the sidewall of the tire. This embodiment substantially or fully covers the tire tread and sidewalls of the tire.

This tire cover was tested by placing a 70 lb tire (31751 grams) in the tire cover and hanging the covered tire for 3 weeks. This weight was sustained by the tire cover, and the tire did not fall out of the tire cover.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A tire cover that comprises:
   a. two flexible sides, each side having:
      i. a width sufficient to cover most of a sidewall of a tire, while allowing, when mounted on the tire, access to the inner opening of the tire; and
      ii. a securing means for securing a respective said side over each sidewall of the tire; wherein the securing means comprises one or more elastic members attached to at least a portion of an outer edge of the respective side;
b. a central member, extending between the two flexible sides, having sufficient length to cover most of the tread of the tire;
c. an adjusting means that is disposed on the central member to adjust the circumference of the tire cover along the tread tire, wherein the adjusting means can be adjusted to fit tires having a diameter ranging between about 55.8 cm and about 78.7 cm; and
d. one or more handles attached to the central member.

2. The tire cover of claim 1, wherein at least one of the central member and the flexible sides are substantially constructed from a material that is at least one of soil-resistant and liquid-resistant.

3. The tire cover of claim 2, wherein the central member and flexible sides are constructed from the same material.

4. The tire cover of claim 3, wherein the central member and flexible sides are constructed from the same piece of material.

5. The tire cover of claim 1, wherein the central member and flexible sides are constructed from different materials.

6. The tire cover of claim 1, wherein the central member is attached to at least one of the flexible sides through a seam.

7. The tire cover of claim 1, wherein the adjusting means is selected from the group consisting of: a fastener, a strap, a snap, a buckle, a trap-lock, a button, a hook, an elastic member, a tie, a clip, a zipper, a drawstring and cord lock, a hook-to-hook arrangement, a hook and loop arrangement, a bungee cord and cord lock, a magnet, a slide, and combinations thereof.

8. A tire cover that comprises:
a. two flexible sides, each side having:
i. a width sufficient to cover most of a sidewall of a tire, while allowing, when mounted on the tire, access to the inner opening of the tire, wherein the width has two outer edges; and
ii. a securable side elastic member attached to each outer edge of each flexible side for securing said side over the sidewall of the tire;
b. a central member, extending between the two flexible sides, having sufficient length to cover most of the tread of the tire; and
c. a fastener disposed on the central member to adjust the circumference of the tire cover along the tread of the tire, wherein the fastener can be adjusted to fit tires having a diameter ranging between about 55.8 cm and about 78.7 cm;
wherein the central member and the flexible sides is substantially constructed from a material that is at least one of soil-resistant and liquid-resistant; and
d. one or more handles attached to the central member.

9. A tire cover that comprises:
a. two flexible sides, each side having:
i. a width sufficient to cover most of a sidewall of a tire, while allowing, when mounted on the tire, access to the inner opening of the tire; and
ii. a securing means for securing a respective said side over each sidewall of the tire wherein the securing means comprises one or more elastic members attached to at least a portion of an outer edge of the respective side;
b. a central member, extending between the two flexible sides, having sufficient length to cover most of the tread of the tire; said central member has two ends;
c. an adjusting means for adjusting the size of the tire cover to fit the tire and for fastening each end of the central member, wherein the adjusting means is disposed on the central member to adjust the circumference along the tread of the tire, and wherein the adjusting means can be adjusted to fit tires having a diameter ranging between about 55.8 cm and about 78.7 cm; and
d. one or more handles attached to the central member;
wherein one of the central member or the flexible sides is substantially constructed from a material that is at least one of soil-resistant and liquid-resistant.

10. The tire cover of claim 9, wherein the central member and flexible sides are constructed from the same material.

11. The tire cover of claim 9, wherein the central member and flexible sides are constructed from the same piece of material.

12. The tire cover of claim 9, wherein the central member and flexible sides are constructed from different materials.

13. The tire cover of claim 9, wherein the central member is attached to at least one of the flexible sides through a seam.

14. The tire cover of claim 9, wherein the adjusting means is selected from the group consisting of: a fastener, a strap, a snap, a buckle, a button, a trap-lock, a hook, an elastic member, a tie, a clip, a zipper, a drawstring and cord lock, a hook-to-hook arrangement, a hook and loop arrangement, a bungee cord and cord lock, a magnet, a slide, and combinations thereof.

15. A tire cover that comprises:
a. two flexible sides, each side having:
i. a width sufficient to cover most of a sidewall of a tire, while allowing, when mounted on the tire, access to the inner opening of the tire; and
ii. a securing means for securing a respective said side over each sidewall of the tire; wherein the securing means is an elastic member attached to an outer edge of the respective side;
b. a central member, extending between the two flexible sides, having sufficient length to cover most of the tread of the tire;
c. an adjusting means disposed on the central member to adjust the circumference of the tire cover along the tread of the tire wherein the adjusting means can be adjusted to fit tires having a diameter ranging between about 55.8 cm and about 78.7 cm; and
d. one or more handles attached to the central member;
wherein the central member and flexible sides are constructed from different materials.

16. The tire cover of claim 15, wherein the central member is attached to at least one of the flexible sides through a seam.

* * * * *